Feb. 16, 1971   J. BELART ET AL   3,563,034
TWO-CIRCUIT MASTER BRAKE CYLINDER
Filed Aug. 11, 1969   3 Sheets-Sheet 3

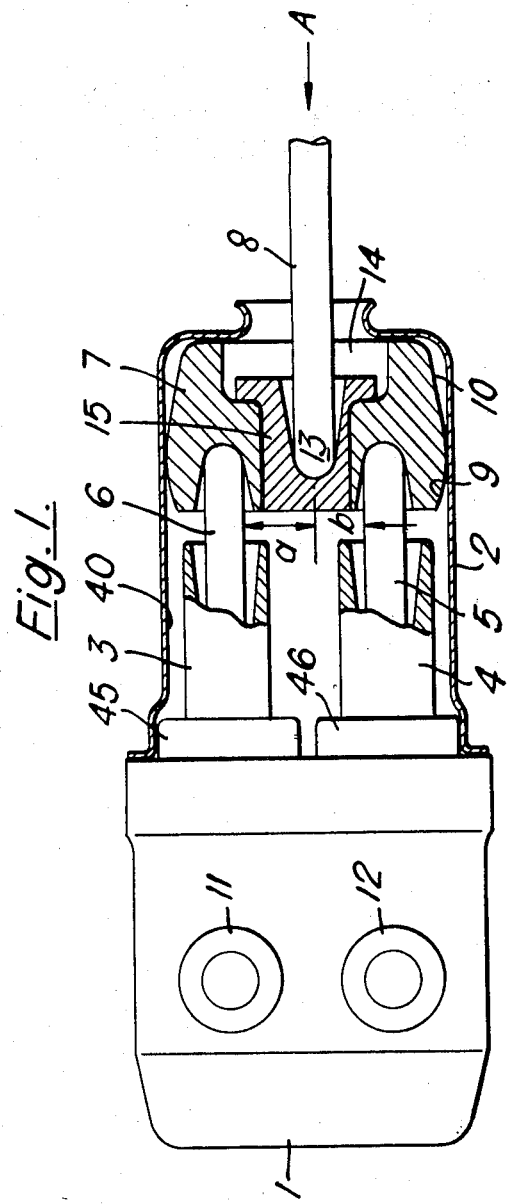

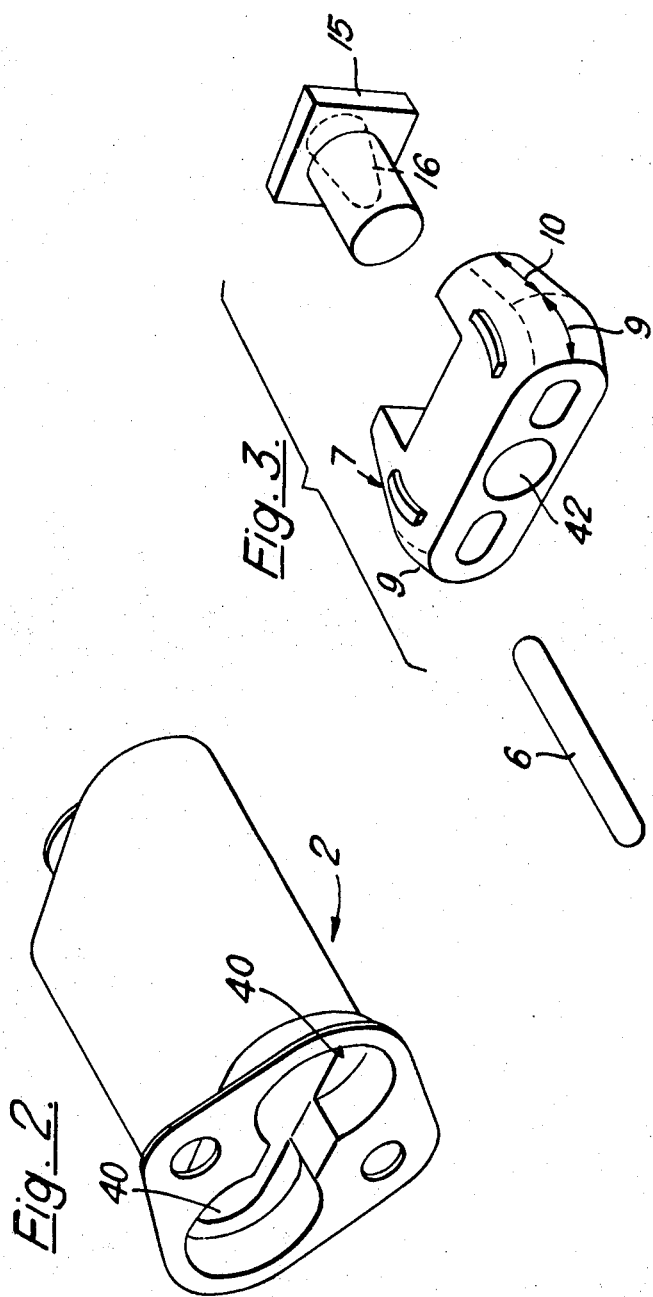

Inventors
Juan Belart
Hans-Dieter Drahtmüller
By Gennaro L. Pasquale
Agent

United States Patent Office 3,563,034
Patented Feb. 16, 1971

3,563,034
TWO-CIRCUIT MASTER BRAKE CYLINDER
Juan Belart, Walldorf, and Hans-Dieter Drahtmuller, Aschaffenburg, Germany, assignors to International Telephone and Telegraph Corporation, New York, N.Y., a corporation of New York
Filed Aug. 11, 1969, Ser. No. 849,122
Claims priority, application Germany, Aug. 16, 1968,
P 17 80 218.5–21
Int. Cl. F15b 7/08
U.S. Cl. 60—54.5                                    4 Claims

ABSTRACT OF THE DISCLOSURE

A two-circuit master cylinder assembly having two parallel cylinders operated by a balance lever having a fulcrum point against which an actuator operates. Stop surfaces are provided on the balance lever and on the housing and/or actuator to limit rotation of the balance lever when one of the cylinders is inoperative thereby preventing binding or jamming of the balance lever.

CROSS REFERENCE TO RELATED APPLICATION

This application is filed under the provisions of 35 USC 119 with a claim for the benefit of the filing date of an application covering the same invention filed on Aug. 16, 1968 Ser. No. 1,780,218 in the Federal Republic of Germany.

BACKGROUND OF THE INVENTION

Field of the invention

The invention relates to a two-circuit master cylinder assembly for hydraulically operated vehicle brakes having two parallel cylinder bores and a single actuator which operates the pistons through a balance lever.

Description of the prior art

Master cylinder assemblies having two parallel cylinders are well known. In one such assembly the cylinder pistons are coupled by means of a balance lever which rests on an edge adjustable on the actuating appliance. A disadvantage of this conventional arrangement is that a component of the actuating force presses the balance lever sidewards against the actuating rod when the balance lever inclines so that friction and jamming may result. Another disadvantage is that there is a relatively large lost motion of the actuating rod before actuation of the brakes when one of the two brake circuits is defective.

Also known is a two-circuit master cylinder whose pistons are movable in parallel cylinder bores by means of a single actuating rod having a forked end acting against a pivot pin on a balance lever. However, this two-circuit master cylinder requires an additional expensive device for pressure compensation. Moreover, the actuating rod tends to jam when one pressure medium circuit is defective.

SUMMARY OF THE INVENTION

It is an object of the present invention to provide a two-circuit master cylinder assembly which can be economically manufactured and which eliminates many of the disadvantages of the master cylinders of this type previously known.

It is a specific object of this invention to provide a two-circuit master cylinder having parallel cylinders and a single actuating rod which will not bind or jam when one of the cylinders becomes defective.

It is another specific object of this invention to provide a two-circuit master cylinder having parallel cylinders and a single actuating rod in which there is a minimum of lost motion of the actuating rod when one of the cylinders becomes defective.

This invention achieves these objects by providing stop faces arranged angularly to each other on the balance lever and on the actuator, cylinder housing or piston tappets in order to limit possible tilting movements of the balance lever. The stop faces on the balance lever come into contact with the corresponding stop faces on the actuator, cylinder housing or piston tappets when one brake circuit is defective.

In one preferred embodiment the balance lever and/or the part providing corresponding stop faces consists of several parts in such a way that the stop faces are adjustable relatively to each other.

The balance lever may have ends which are spherical in part with the stop faces on part of the ends which form a truncated cone.

Preferably, the actuating rod acts on the balance lever through a cylindrical insert which has an offset conical recess for receiving the actuating rod so that the insert may be turned in the balance lever to change the pivot point of the balance lever. The balance lever is expediently held and moved with its outer guide surfaces on the inner wall of the master cylinder housing. The thrust piece can also be constructed furcatedly and can embrace and move the balance lever with its lateral parts. The master cylinder pistons may be constructed as displacement plungers instead of true pistons to reduce manufacturing costs.

BRIEF DESCRIPTION OF THE DRAWINGS

FIG. 1 is a partially sectioned view of a master cylinder embodying the present invention.

FIG. 2 is a perspective representation of one of the two housing halves of the master cylinder shown in FIG. 1.

FIG. 3 is an exploded perspective view of the balance lever, insert and one of the two tappets shown in FIG. 1.

DESCRIPTION OF THE PREFERRED EMBODIMENTS

Figure 4:
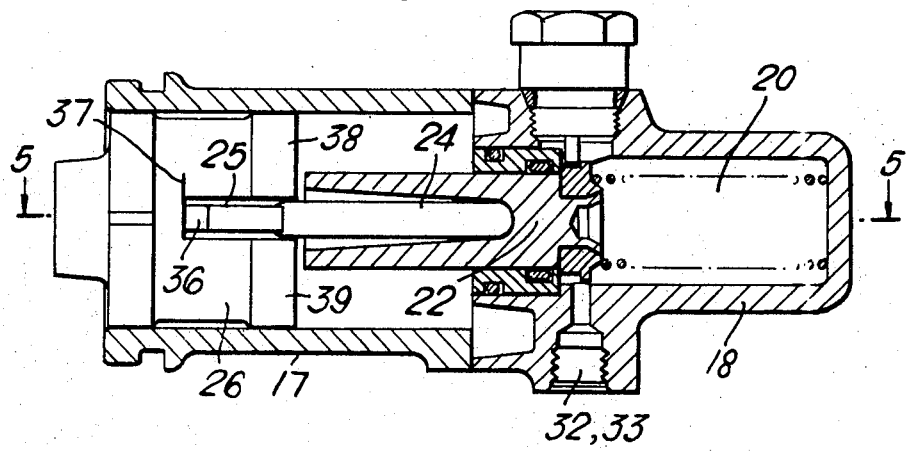
FIG. 4 is a longitudinal sectional view of another master cylinder embodying the present invention.

Referring to FIG. 1 there is shown a master cylinder assembly having two housing halves 1 and 2, the housing half 2 being depicted in section so that the mechanism for the actuation of the pistons can be seen. Two pistons or plungers 3 and 4 respectively are actuated by balance lever 7 through tappets or push rods 5 and 6. The balance lever 7 itself is moved in the direction of arrow A through an actuating rod 8 which is connected with a brake pedal, not shown or described in detail.

As is apparent from FIG. 3, at least a section 9 of the peripheral surface of the balance lever 7 is designed as a curved or spherical surface, whereas another part 10 of the peripheral surface of the balance lever 7 is designed as a part of the outer surface of a truncated cone.

If the balance lever 7, which is guided with its faces 9 on the inner wall 40 of the housing part 2, is moved by the actuating rod 8 in the direction of arrow A the pistons 3 and 4 of the two master cylinders, not described in detail and arranged in the housing part 1, are simultaneously moved by the tappets or push rods 5 and 6 in such a way that hydraulic fluid is pressed forth via the connections 11 and 12. If one of the master cylinders is defective or if there is a leakage in one of the hydraulic lines connected at 11 or 12, no pressure can build up in the master cylinder connected to the defective brake circuit, and consequently the respective piston 3 or 4 can be moved in the direction of arrow A relatively further than the piston of the operative master cylinder. As a result, the balance lever 7 inclines or tilts about the end 13 of the actuating rod 8, but only until the conical part 10 of the balance lever 7 is brought into contact with the inner wall 40 of the housing half 2. The balance lever 7 can now be moved further in this inclined position by the actuating appliance 8 in the direction of arrow A without further tilting or swinging about the end 13 of the actuating rod 8.

The angle which the surfaces 10 form with respect to each other thus determines the maximum movement of the tappets 5 and 6 with respect to each other when one of the two brake circuits is defective.

Since different pressures can accumulate in the master cylinders when equal plunger diameters and different lever arms $a:b$ are used, a thrust piece 15 shown in FIG. 3 is fitted in the hole 42 of the balance lever 7. The notch or conical recess 16 of the thrust piece 15 is eccentric with respect to the center of the thrust piece and balance lever 7 so that the effective lengths $a$ and $b$ of the balance lever can be changed by turning this insert 15. Different volumes are displaced by the pistons when different lever arms $a$ and $b$ and different diameters of the pistons 3 and 4 are used. Hence different pressures can be achieved by rotating the thrust piece 15 or by changing the balance lever 7. If displacement plungers instead of pistons are provided, the relative volume displacements of the cylinders may be varied by changing the diameter of the plungers and the corresponding sealing bushings 45 and 46.

Figure 5:
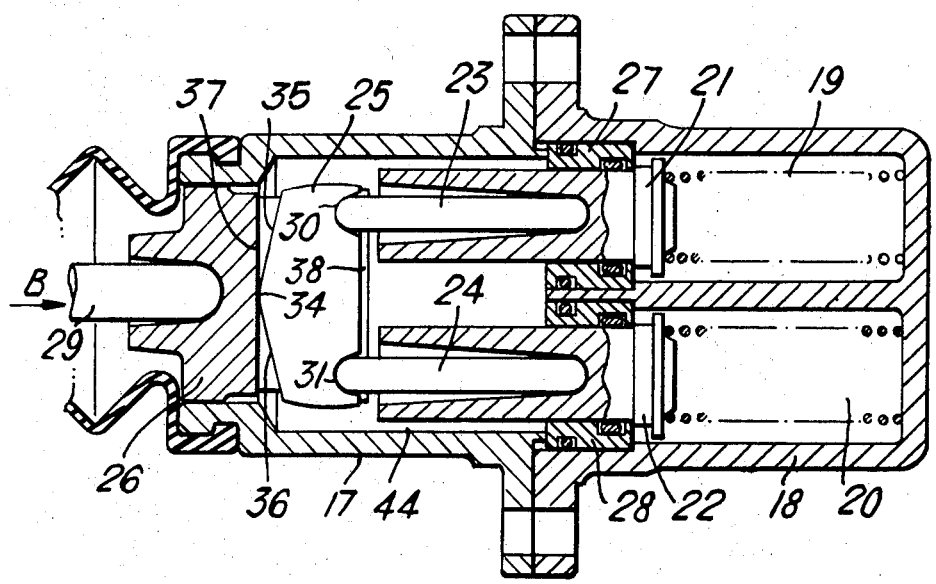
FIG. 5 is an axial sectional view taken on the plane indicated by line 5—5 of FIG. 4.

The two-circuit master cylinder assembly shown in FIGS. 4 and 5 comprise housing halves 17 and 18, having cylinder bores 19 and 20 provided with pistons 21 and 22 in the housing half 18. Tappets 23 and 24 for moving the pistons 21 and 22 are actuated by the thrust piece 26 through the balance lever 25. In order to reduce the manufacturing costs of the housing part 18 significantly, the pistons 21 and 22 are constructed as displacement plungers so that the cylinder bores 19 and 20 require no superfinish. The pistons 21 and 22 are sealed relatively to the interior of the housing half 17 by sealing bushings 27 and 28. The interior of the housing half 17 can either be directly connected to atmosphere through small compensation bores, not shown, or closed and filled with a fluid which prevents the balance lever 25, pistons 21 and 22 and the tappets 23 and 24 from corroding.

To actuate the master cylinder the thrust piece 26 is pushed in the direction of arrow B by means of the actuating rod 29. The balance lever 25 also moves simultaneously in the same direction and pushes both pistons 21 and 22 via the tappets 23 and 24 supported in grooves or conical recesses 30 and 31. Brake pressure is built up in the cylinder bores 19 and 20 and is transmitted to the wheel cylinders through hydraulic fluid lines.

If leakage occurs in one of the two brake circuits, the respective piston 21 or 22 can be moved in the direction of arrow B further than the piston which provides for the pressure build-up in the intact brake circuit. As a result of the uneven operation, the balance lever 25 tilts about its bearing point 34 on the thrust piece 26 until one of the inclined surfaces 35 and 36 firmly abuts the bearing surface 37 on the thrust piece 26. Further tilting or swinging of the balance lever 25 about the bearing point 34 will no longer be possible since the angle which is formed by the two inclined surfaces 35 and 36 with respect to each other determines the extent to which the pistons 21 or 22 can move relatively to each other. In order to vary the possible relative movement of the two pistons 21 and 22 the balance lever can also be constructed in several parts in such a manner that the angle which the inclined surfaces 35 and 36 form together can be changed before the installation of the balance lever.

As will be apparent from FIG. 4 the thrust piece 26 is constructed furcatedly, that is, with the thrust piece enclosing with its lateral parts 38 and 39, the balance lever 25 to prevent the lever from turning about the longitudinal axis of the master cylinder assembly.

Similarly, instead of the stop faces 35 and 36 arranged angularly in relation to each other corresponding stop faces can be provided on the thrust piece 26. Hence in this case the thrust piece 26, instead of providing a single even stop face 37 on the side of the piston, provides two stop faces which incline to the longitudinal axis of the master cylinder at an angle less than 90°. In the embodiment shown in FIGS. 1 and 2 it is possible to provide the stop faces 40 in such a manner that they are arranged angularly wtih respect to the longitudinal axis of the master cylinder instead of parallel to each other on the inner wall of the housing section 2.

It will be appreciated that the invention illustrated and described herein may be modified by those skilled in the art without deviating from the spirit and scope of the invention as set forth in the following claims.

We claim as our invention:

1. An improvement in a two-circuit master cylinder assembly for hydraulically operated vehicle brakes comprising; a housing having two parallel cylinders therein, a piston reciprocally movable in each cylinder, a balance lever having one side of each end adapted to operate one of the pistons and an actuator reciprocally movable in the housing and having an end adapted to push the other side of the balance lever to transmit the actuating force to the pistons wherein the improvement comprises stop surfaces on the balance lever engageable with corresponding stop surfaces on the housing to limit tilting of the balance lever.

2. The improvement in a two-circuit master cylinder assembly of claim 1 wherein the ends of the balance lever have edges which are curved on the side adjacent to the pistons and tapered toward the other side so that the tapered edges form the stop surfaces on the balance lever and the housing walls form the other stop surfaces.

3. The improvement in a two-circuit master cylinder assembly of claim 1 wherein the end of the actuator engages an eccentric conical recess in a cylindrical insert in the balance lever so that the lever ratio may be changed by rotating the insert.

4. The improvement in a two-circuit master cylinder assembly of claim 2 wherein the end of the actuator engages an eccentric conical recess in a cylindrical insert in the balance lever so that the lever ratio may be changed by rotating the insert.

References Cited

UNITED STATES PATENTS

| 2,319,368 | 5/1943 | Schnell | 60—54.6EX |
| 2,596,119 | 5/1952 | Blackman | 60—54.6E |
| 2,857,584 | 10/1958 | Gibson | 60—54.6EX |

MARTIN P. SCHWADRON, Primary Examiner

R. BUNEVICH, Assistant Examiner

U.S. Cl. X.R.

188—152